(12) United States Patent
Jenkins et al.

(10) Patent No.: US 12,168,504 B2
(45) Date of Patent: **\*Dec. 17, 2024**

(54) UNMANNED SAILING VEHICLE CONTROL SYSTEM

(71) Applicant: Saildrone, Inc.

(72) Inventors: Richard Elliott Jenkins, Alameda, CA (US); Dylan Owens, Oakland, CA (US)

(73) Assignee: Saildrone, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 18/349,094

(22) Filed: Jul. 7, 2023

(65) Prior Publication Data

US 2023/0348033 A1 Nov. 2, 2023

Related U.S. Application Data

(63) Continuation of application No. 17/373,490, filed on Jul. 12, 2021, now Pat. No. 11,731,748, which is a
(Continued)

(51) Int. Cl.
*B63H 9/061* (2020.01)
*B63B 1/10* (2006.01)
(Continued)

(52) U.S. Cl.
CPC ............... *B63H 9/061* (2020.02); *B63B 1/10* (2013.01); *B63B 1/12* (2013.01); *B63B 1/125* (2013.01);
(Continued)

(58) Field of Classification Search
CPC . B63H 9/00; B63H 9/06; B63H 9/061; B63H 9/08; B63H 25/00; B63H 25/04;
(Continued)

(56) References Cited

U.S. PATENT DOCUMENTS 3,094,959 A 6/1963 Fox
3,844,238 A 10/1974 Murray
(Continued)

FOREIGN PATENT DOCUMENTS

CN 1829629 A 9/2006
CN 105228893 A 1/2016
WO WO2014/152068 9/2014

OTHER PUBLICATIONS

The State Intellectual Property Office of the People's Republic of China, "First Office Action" in application No. 2014800276077, dated Sep. 5, 2016, 5 pages.
(Continued)

*Primary Examiner* — Lars A Olson
(74) *Attorney, Agent, or Firm* — Wei IP Law, PC

(57) ABSTRACT

An unmanned sailing vehicle comprising: a primary hull; a rigid wing rotationally coupled with said primary hull that freely rotates about a rotational axis of said rigid wing; a boom comprising a first end extending from a leading edge of said rigid wing and a second end extending from a trailing edge of said rigid wing, said first end of said boom comprising a counterweight configured to dynamically balance a wing system comprising said rigid wing, said boom, and said tail with respect to said rotational axis of said rigid wing; a tail coupled to said second end of said boom; a control surface element disposed on said tail and configured to aerodynamically control a wing angle of said rigid wing based on a position of said control surface element; and a controller configured to determine a control surface angle and generate a signal to position said control surface element.

20 Claims, 10 Drawing Sheets

Related U.S. Application Data continuation of application No. 16/653,661, filed on Oct. 15, 2019, now Pat. No. 11,059,553, which is a continuation of application No. 15/805,927, filed on Nov. 7, 2017, now Pat. No. 10,442,512, which is a continuation of application No. 15/176,389, filed on Jun. 8, 2016, now Pat. No. 9,834,290, which is a continuation of application No. 14/682,732, filed on Apr. 9, 2015, now Pat. No. 9,381,985, which is a continuation of application No. 13/802,735, filed on Mar. 14, 2013, now Pat. No. 9,003,986.

(51) Int. Cl.
| | |
|---|---|
| B63B 1/12 | (2006.01) |
| B63B 43/00 | (2006.01) |
| B63B 43/02 | (2006.01) |
| B63B 71/20 | (2020.01) |
| B63G 8/00 | (2006.01) |
| B63G 8/22 | (2006.01) |
| B63G 8/28 | (2006.01) |
| B63G 8/38 | (2006.01) |
| B63H 9/08 | (2006.01) |
| B63H 25/04 | (2006.01) |
| B63H 25/38 | (2006.01) |
| G05D 1/00 | (2006.01) |
| G05D 1/02 | (2020.01) |
| G05D 1/08 | (2006.01) |
| H02S 40/38 | (2014.01) |
| B63B 35/00 | (2020.01) |

(52) U.S. Cl.
CPC .............. *B63B 43/00* (2013.01); *B63B 43/02* (2013.01); *B63B 71/20* (2020.01); *B63G 8/001* (2013.01); *B63G 8/22* (2013.01); *B63G 8/28* (2013.01); *B63G 8/38* (2013.01); *B63H 9/08* (2013.01); *B63H 25/04* (2013.01); *B63H 25/38* (2013.01); *G05D 1/0206* (2013.01); *G05D 1/0875* (2013.01); *H02S 40/38* (2014.12); *B63B 2035/007* (2013.01); *B63G 2008/004* (2013.01); *B63H 9/0635* (2020.02); *B63H 2009/082* (2013.01); *B63H 2025/045* (2013.01)

(58) Field of Classification Search
CPC .............. B63H 25/38; B63H 2009/082; B63H 9/0635; B63H 2025/045; H02S 40/38; B63B 71/00; B63B 71/20; B63B 1/00; B63B 1/10; B63B 1/12; B63B 1/125; B63B 43/00; B63B 43/02; B63B 2035/007; B63G 8/00; B63G 8/001; B63G 8/22; B63G 8/28; B63G 8/38; B63G 2008/004; G05D 1/02; G05D 1/0206; G05D 1/08; G05D 1/0875
USPC .......................................................... 701/21
See application file for complete search history.

(56) References Cited

U.S. PATENT DOCUMENTS

| | | | |
|---|---|---|---|
| 3,972,301 | A | 8/1976 | Portta |
| 4,543,899 | A | 10/1985 | Walker |
| 4,843,987 | A | 7/1989 | Samuels |
| 5,540,170 | A | 7/1996 | Purdy |
| 5,860,381 | A | 1/1999 | Fernandini |
| 6,269,763 | B1 | 8/2001 | Woodland |
| 6,854,406 | B2 | 2/2005 | Cardoza et al. |
| 7,000,555 | B1 | 2/2006 | Bucher |
| 7,255,054 | B1 | 8/2007 | DiGregori |
| 7,461,609 | B1 | 12/2008 | Ott et al. |
| 7,712,427 | B2 | 5/2010 | Ott et al. |
| 7,789,723 | B2 | 9/2010 | Dane |
| 8,069,801 | B2 | 12/2011 | Ott et al. |
| 8,265,809 | B2 | 9/2012 | Webb |
| 9,003,986 | B2 * | 4/2015 | Jenkins .................. B63H 25/04 114/102.16 |
| 9,381,985 | B2 * | 7/2016 | Jenkins .................. B63H 25/04 |
| 9,834,290 | B2 * | 12/2017 | Jenkins .................. B63H 25/04 |
| 10,442,512 | B2 * | 10/2019 | Jenkins .................. B63H 25/04 |
| 11,059,553 | B2 * | 7/2021 | Jenkins .................. B63H 25/04 |
| 11,731,748 | B2 * | 8/2023 | Jenkins .................. B63H 25/04 701/21 |
| 2012/0031319 | A1 | 2/2012 | Jarke |
| 2012/0145062 | A1 | 6/2012 | Ott et al. |
| 2013/0014683 | A1 | 1/2013 | Hoyt |
| 2014/0116311 | A1 | 5/2014 | Holemans |
| 2014/0261126 | A1 | 9/2014 | Jenkins et al. |
| 2015/0210369 | A1 | 7/2015 | Jenkins et al. |
| 2016/0280348 | A1 | 9/2016 | Jenkins et al. |
| 2018/0072393 | A1 | 3/2018 | Jenkins et al. |
| 2020/0039620 | A1 | 2/2020 | Jenkins et al. |

OTHER PUBLICATIONS

Kaess, Michael et al., Ship Hull Inspection, available at "groups.csail.mit.edu/marine/wiki/index.php?title=Ship_Hull_Inspection", Sep. 7, 2012.
Claims in application No. PCT/US 14/26911, dated Aug. 2014, 5 pages.
Dao, Paulina "Robotboat: transforming ocean research, one boat at a time, MarineExplore Blog, Oct. 26, 2012, http://marinexplore.com/blog/robotboat-transforming-ocean-research-one-boat-at-a-time/)".
Dasilva, Steven J et al., Gatekeeper: An Untethered, Persistent, Station-Keeping Gateway Buoy, OCEANS 2009, Marine Technology for Our Future: Global and Local Challenges, Oct. 26, 2009, 7 pages.
Elkaim G. "System Identification for Precision Control of Wingsailed GPS-Guided Catamaran", Dissertation submitted to the Department of Aeronautics and Astronautics, Stanford Univeristy, dated Dec. 2001.
Elkaim G. "The Atlantis project: A GPS-guided wing-sailed autonomous catamaran." Navigation 53.4 ( Winter 2006): 237-247.
Elkaim, Gabriel, "Autonomous Surface Vehicle Free-Rotating Wingsail Section Design and Configuration Analysis" Journal of Aircraft vol. 45, No. 6, dated Apr. 2008, 18 pages.
Fer Ilker et al. Navigation performance of the SailBuoy Bergen—Scotland mission, CMR Instrumentation Aug. 30, 2012.
Fer Ilker et al. Near surface oceanographic measurements using the SailBuoy Test deployment off Grand Canaria, CMR Instrumentation Aug. 30, 2012.
Carrig, Eamon, Robotboat Mark VI, http://www.kickstarter.com/projects/robotboat/robotboat-mark-vi, Oct. 2012, Kickstarter.
International Searching Authority, "Search Report" in application No. PCT/US14/26911, dated Aug. 18, 2014, 4 pages.
Stelzer et al., "Robotics and Autonomous Systems", vol. 56, pp. 604-614, dated Oct. 22, 2007, 11 pages.
Lam, Brian "Robot Boats Survive Epic Voyage Across the Pacific—So Far" Wired, May 2012 available at http://www.wired.com/gadgetlab/2012/05/wave-glider-crosses-pacific/.
Leedekerken, Jacques, et al. "Autonomous Mapping of Complex Marine Environments, Aug. 20, 2010, groups.csail.mit.edu/marine/wiki/index.php?title=Autonomous_Mapping_of_Complex_Marine_Environments".
Mcgillivary, Phil et al. "Autonomous Surface Vessels for Airsea Flux and Satellite Calibration / Validation Studies", Presented at 1st Joint GOSUD/SAMOS Workshop Boulder, CO May 2-4, 2006.
Quick, Darren "Fully Autonomous ASV Roboat to Make World Record Attempt", http://www.gizmag.com/asv-robot-fully-autonomous-sailboat-to-make-world-record-attempt/22559, dated May 15, 2012, 6 pages.
Ronsin, Kostia "Autonomous Sailing Boat", ENSTA Bretagne BMS Natural Propulsion Seminar Jan. 23, 2012.

(56) References Cited

OTHER PUBLICATIONS

Rynne, Patrick et al. "Unmanned autonomous sailing: Current status and future role in sustained ocean observations." Marine Technology Society Journal 43.1 (2009): 21-30.
Sauze, Colin et al. "An autonomous sailing robot for ocean observation." Department of Computer Science University of Wales, Aberystwyth (2006).
Solar Sailor "Solar Sails", Jan. 12, 2012, Available at "solarsailor.com/solar-sails/".
Frizzell-Makowski, L. J.; Shelsby, R. A.; Mann, J.; Scheidt, D., An autonomous energy harvesting station-keeping vehicle for Persistent Ocean Surveillance, OCEANS 2011 , vol., no., pp. 1,4, 19-22.

* cited by examiner

UNMANNED SAILING VEHICLE CONTROL SYSTEM

CROSS-REFERENCE TO RELATED APPLICATIONS; BENEFIT CLAIM

This application claims the benefit as a Continuation of application Ser. No. 17/373,490, filed Jul. 12, 2021, which a Continuation of application Ser. No. 16/653,661, now issued U.S. Pat. No. 11,059,553, filed Oct. 15, 2019, which is a Continuation of application Ser. No. 15/805,927, filed Nov. 7, 2017, now issued U.S. Pat. No. 10,442,512, which is a Continuation of application Ser. No. 15/176,389, filed Jun. 8, 2016, now issued U.S. Pat. No. 9,834,290, which is a Continuation of application Ser. No. 14/682,732, filed Apr. 9, 2015, now issued U.S. Pat. No. 9,381,985, which is a Continuation of application Ser. No. 13/802,735, filed Mar. 14, 2013, now issued U.S. Pat. No. 9,003,986, the entire contents of which is hereby incorporated by reference as if fully set forth herein, under 35 U.S.C. § 120. The applicant(s) hereby rescind any disclaimer of claim scope in the parent application(s) or the prosecution history thereof and advise the USPTO that the claims in this application may be broader than any claim in the parent application(s).

FIELD OF THE DISCLOSURE

The present disclosure generally relates to the field of autonomous vehicles, and relates more specifically to control systems.

BACKGROUND

The demand for autonomous and unmanned vehicles has increased. Unmanned, autonomous vehicles have been developed with varying degrees of success on different terrain, such as land, surface streets, and even space. However, the development of technologies for unmanned autonomous ocean vehicles has been limited. The Microtransat challenge to be the first fully autonomous boat to cross the Atlantic has yet to be completed. As of filing, the published record distance achieved by an autonomous sailing vehicle is a mere 78.9 nautical miles. See Quick, Darren, "Fully autonomous ASV Roboat to make world record attempt," Gizmag.com, May 15, 2012, Available at http://www.gizmag.com/asv-rob oat-fully-autonomous-sailboat-to-make-world-record-attempt/22559/.

Conventional techniques for open ocean research, exploration, monitoring, and other data gathering applications are cost prohibitive. One method is to deploy or charter ships capable of staying out at sea for the duration required. The expense of operating a manned vehicle is high, especially if the operation involves an extended duration, distance from land, or potentially rough conditions. Another method is to deploy one or more buoys. However, the complexity and cost of installing a buoy at a deep water location is high. Therefore, the use of buoys is typically restricted to shallow ocean regions. Remote imaging is another method that may be used to observe the ocean. However, only limited data is observable using imaging techniques.

One constraint on the distance any vehicle can cover is the availability of power. An ocean vehicle must carry, generate or otherwise harness all the power it consumes during a trip away from land. Another constraint is the ability to navigate rough ocean conditions. This is particularly true for wind powered vehicles given the particularly dangerous conditions of the sea surface.

Despite the desirability of an unmanned autonomous sailing vehicle capable of long-distance ocean travel for environmental, military, monitoring, scientific, research and other activities, attempts to develop the technology have not been successful. To overcome the problems and limitations described above, there is a need for an autonomous unmanned sailing vehicle as described herein.

SUMMARY

The appended claims may serve as a summary.

BRIEF DESCRIPTION OF THE DRAWINGS

The above and other aspects, features and advantages of the invention will be more apparent from the following more particular description thereof, presented in conjunction with the following drawings wherein.

DETAILED DESCRIPTION

An autonomous unmanned sailing vehicle will now be described. In the following description, numerous specific details are set forth in order to provide a more thorough understanding of embodiments of the invention. It will be apparent, however, to a person of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention. Furthermore, a person of ordinary skill in the art will recognize that methods and processes described herein may be performed in a different order, in series, in parallel, and/or in a multi-threaded environment without departing from the spirit or the scope of the invention.

Figure 1:
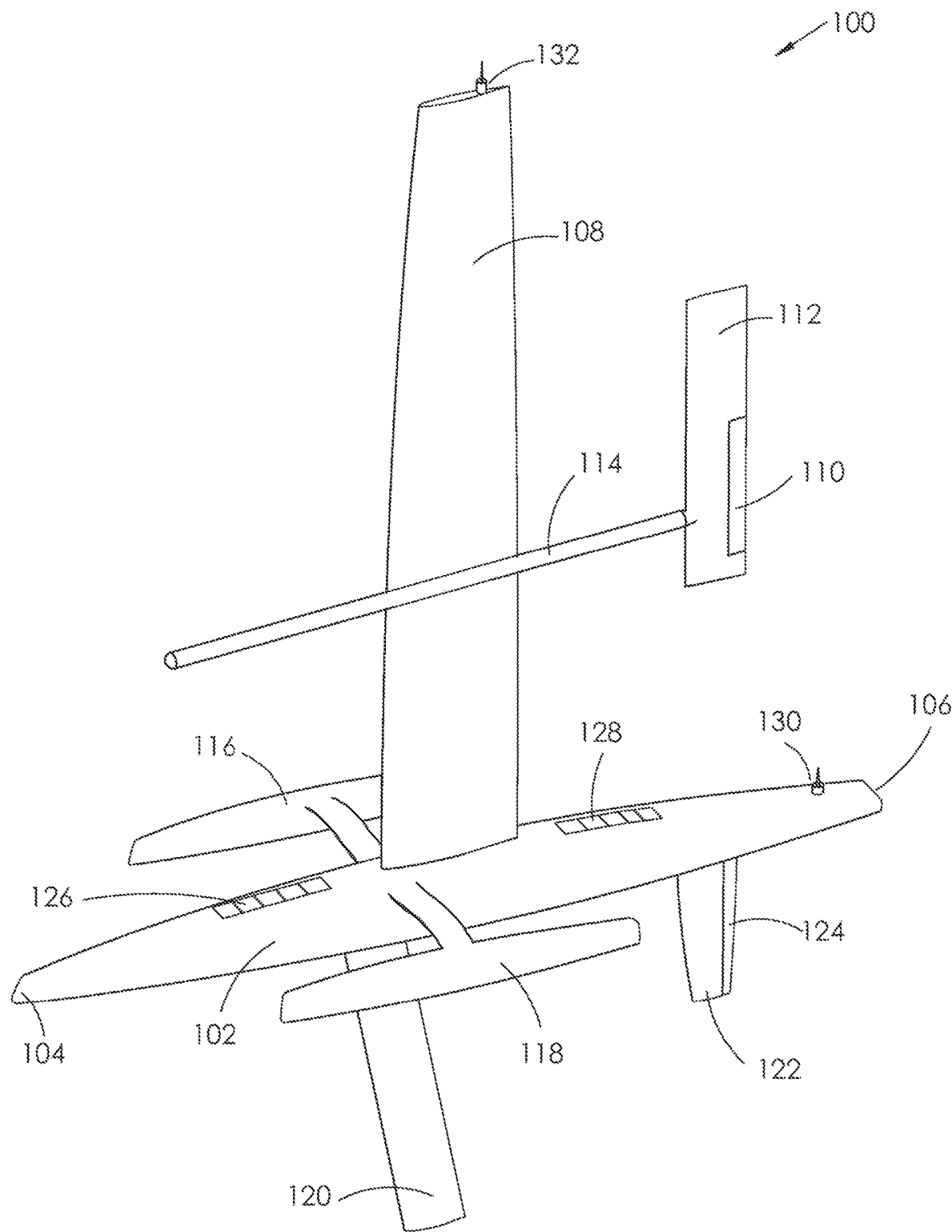
FIG. 1 illustrates a perspective view of an embodiment of an autonomous unmanned sailing vehicle in accordance with one or more embodiments of autonomous unmanned sailing vehicles described herein.

FIG. 1 illustrates a perspective view of an embodiment of an autonomous unmanned sailing vehicle in accordance with one or more embodiments of autonomous unmanned sailing vehicles described herein. Autonomous sailing vehicle 100 includes primary hull 102.

Primary hull 102 is associated with a primary axis running from bow 104 to stern 106. More specifically, autonomous sailing vehicle 100 may rotate about the primary axis of primary hull 102 when an applied torque moves autonomous sailing vehicle 100 from an upright position.

In one embodiment, primary hull 102 has a narrow bow 104 with reduced buoyancy, allowing primary hull 102 to break through at least a top portion of a wave due to the properties of bow 104.

Autonomous sailing vehicle 100 further includes rigid wing 108. Rigid wing 108 is rotationally coupled with primary hull 102 such that rigid wing 108 freely rotates along a rotational axis of rigid wing 108. The rotational axis of rigid wing 108 may be selected to statically balance rigid wing 108 with respect its rotational axis.

More generally, rigid wing 108 and/or any component coupled with rigid wing 108 (e.g. any counterweight, tail, control surface element, boom, sensor/s, communication device/s, power source, wiring, or any other component coupled with rigid wing 108) may be statically and/or dynamically balanced with respect to the rotational axis of rigid wing 108.

In one embodiment, rigid wing 108 is the primary propulsion system of autonomous sailing vehicle 100. Autonomous sailing vehicle 100 may derive substantially all of its propulsion from wind power.

In one embodiment, rigid wing 108 is removably coupled with primary hull 102, such as to facilitate transportation, repair, storage, or any other function.

Autonomous sailing vehicle 100 further includes control surface element 110. Control surface element 110 is configured to aerodynamically control a wing angle of rigid wing 108 based on a force exerted by wind on control surface element 110. In one embodiment, control surface element 110 is configured to control a wing angle of rigid wing 108 with respect to the wind. More specifically, control surface element 110 reacts to the flow of the wind to control the wing angle of freely rotating rigid wing 108, thereby controlling the amount of lift produced.

In one embodiment, control surface element 110 may be positioned in three distinct positions: a first maximum angle, a second maximum angle, and a neutral angle. When the control surface element angle is set to the first maximum angle, control surface element 110 positions rigid wing 108 at a first wing angle relative to the wind that creates lift in a first lift direction perpendicular to the direction of the wind. When the control surface element angle is set to the second maximum angle, control surface element 110 positions rigid wing 108 a second wing angle relative to the wind that creates lift in a second lift direction opposite to the first lift direction. When the control surface element angle is set to the neutral angle, substantially no lift is created. The first maximum angle and the second maximum angle may be selected to maximize lift.

Although not identical to traditional sailing, changing the control surface element angle between the first maximum angle and the second maximum angle is at least partially analogous to tacking and jibing. No lift may be desired in certain circumstances, such as when excessive wind is encountered or when substantially no motion is desired.

In an alternate embodiment, control surface element 110 may be positioned at any angle between the first maximum angle and the second maximum angle. When the control surface element angle is set to a neutral angle located between the first maximum angle and the second maximum angle, substantially no lift is created. As the wing angle is moved from the neutral angle to the first maximum angle, the lift generated in the first lift direction is increased. As the wing angle is moved from the neutral angle to the second maximum angle, the lift generated in the second lift direction is increased.

A controller may be configured to determine a control surface angle associated with a desired direction of travel determined by the controller and generate a signal to position control surface element 110 based on the determined control surface angle.

Autonomous sailing vehicle 100 further includes tail 112. In autonomous sailing vehicle 100, control surface element 110 is disposed on tail 112, and tail 112 is coupled with rigid wing 108 via 114 to aerodynamically control a wing angle of rigid wing 108. Although one possible configuration for aerodynamically controlling the angle of rigid wing 108 is shown in FIG. 1, other configurations for the control surface element may be used to control the angle of a rigid wing without departing from the spirit or the scope of the invention, including but not limited to the configurations shown in FIGS. 6A-6C.

Autonomous sailing vehicle 100 further includes keel 120. Keel 120 is coupled with primary hull 102 at a first end. In one embodiment, keel 120 is removably coupled with primary hull 102, such as to facilitate transportation, repair, storage, or any other function. As shown, keel 120 is coupled to primary hull 102, but one or more keels may be coupled with any underwater surface of autonomous sailing vehicle 100 without departing from the spirit or the scope of the invention.

Keel 120 includes sufficient ballast to provide a positive righting moment when primary hull 102 is rotated to any angle about its primary axis. In particular, keel 120 includes sufficient ballast to passively right autonomous sailing vehicle 100 from any position, including any position outside of normal operating range. Suitable ballast may include lead, concrete, iron or any other high-density material suitable for use as ballast.

As used herein, the term "normal operating range" refers to any orientation of the primary hull where the rigid wing is capable of generating lift.

As used herein, the term "positive righting moment" refers to any torque tending to restore a vehicle to an upright position. Buoyant compartments, such as sealed dry compartments, may provide positive righting moment depending on the orientation of the vehicle relative to the buoyant compartment. However, depending on the rotation of the hull of a vehicle, a buoyant compartment may prevent righting of the hull of the vehicle.

Figure 2:
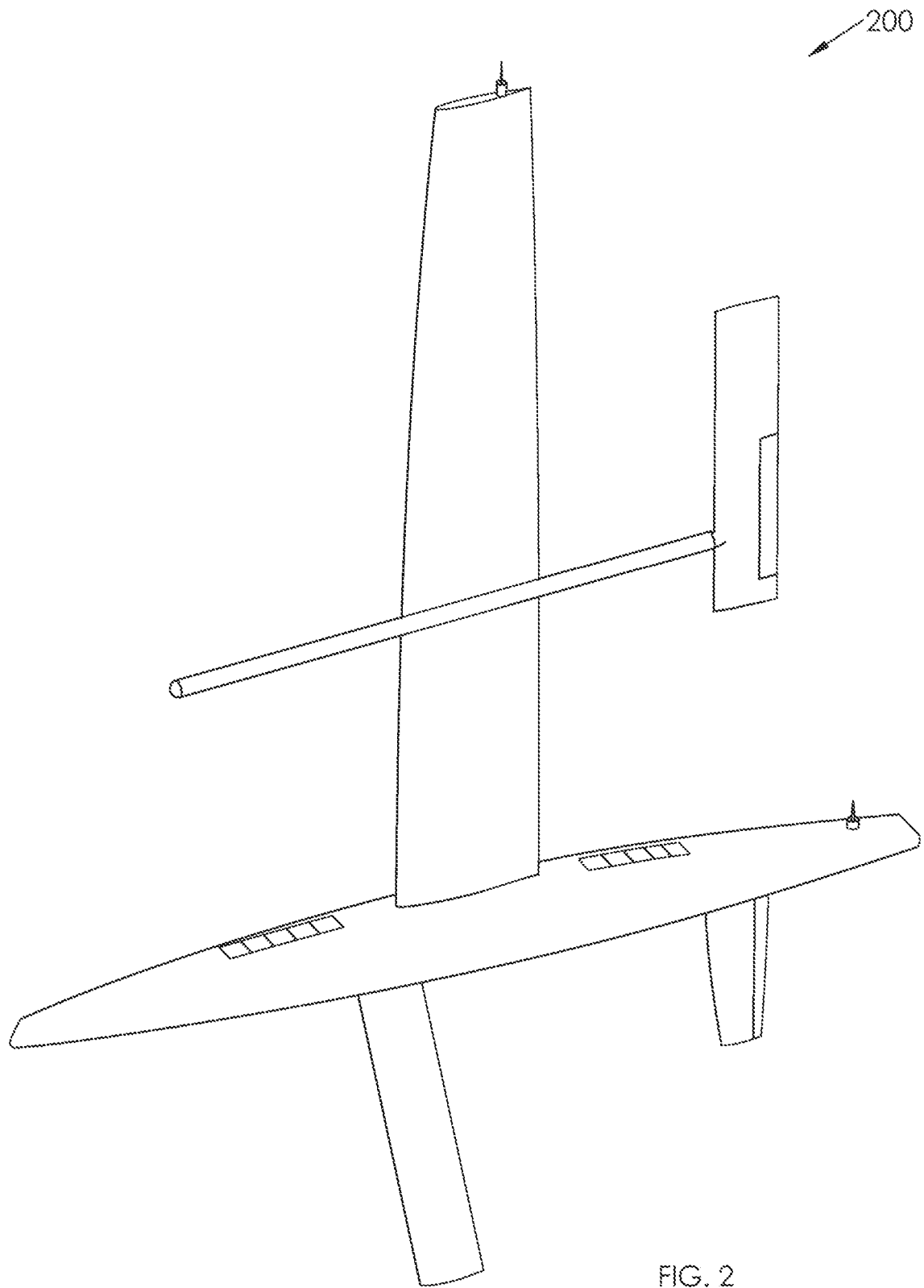
FIG. 2 illustrates a perspective view of an embodiment of an autonomous unmanned sailing vehicle in accordance with one or more embodiments of autonomous unmanned sailing vehicles described herein.

Autonomous sailing vehicle 100 further includes outrigger hulls 116-118. Autonomous sailing vehicle 100 is shown with two outrigger hulls 116-118. Although two outrigger hulls are shown in FIG. 1, other configurations with zero, one, or more outrigger hulls may be used without departing from the spirit or the scope of the invention, including but not limited to autonomous sailing vehicle 200 shown in FIG. 2. FIG. 2 illustrates a perspective view of an embodiment of an autonomous unmanned sailing vehicle in accordance with one or more embodiments of autonomous unmanned sailing vehicles described herein.

In one embodiment, outrigger hulls 116-118 are positioned above a water line when autonomous sailing vehicle 100 is in a fully upright position. Outrigger hulls 116-118 may fully or partially submerge when autonomous sailing vehicle 100 is in normal operating range. Outrigger hulls 116-118 are configured to provide positive righting moment in normal operating range, specifically when they are fully or partially submerged. For example, first outrigger hull 116 may be configured to provide a first additional righting moment when primary hull 102 is rotated in a first direction that causes first outrigger hull 116 to submerge, and second outrigger hull 118 may be configured to provide a second additional righting moment when primary hull 102 is rotated in a second direction that causes second outrigger hull 118 to submerge.

In one embodiment, keel 120 includes sufficient ballast to account for the additional righting moments provided by outrigger hulls 116-118, causing autonomous sailing vehicle 100 to passively right from any position, including any position outside of normal operating range. Specifically, keel 120 may include sufficient ballast to account for negative righting moments of outrigger hulls 116-118 when autonomous sailing vehicle is outside of normal operating range, such as when autonomous sailing vehicle is in a capsized position.

Autonomous sailing vehicle 100 further includes rudder 122. Rudder 122 is configured to control a direction of movement of primary autonomous sailing vehicle 100 through the water. As shown, rudder 122 is coupled to primary hull 102, but one or more rudders may be coupled with any underwater surface of autonomous sailing vehicle 100 without departing from the spirit or the scope of the invention.

Rudder 122 may include rudder tab 124. Rudder tab 124 is a positionable component of rudder 122. In one embodiment, rudder 122 is removably coupled with primary hull 102, such as to facilitate transportation, repair, storage, or any other function.

A controller may be configured to determine a rudder position associated with a desired direction of travel determined by the controller and generate a signal to position rudder 122 based on the determined rudder position. In one embodiment, the rudder includes a positionable rudder tab 124, and the determined rudder position corresponds to a rudder tab position.

Autonomous sailing vehicle 100 further includes at least one solar panel 126-128. Solar panels 126-128 may be configured to charge one or more power sources for one or more systems of autonomous sailing vehicle 100. In one embodiment, solar panels 126-128 may be configured to directly power one or more systems of autonomous sailing vehicle 100.

Autonomous sailing vehicle 100 further includes at least one communication device 130-132. One or more communication devices 130-132 may be disposed outside of, within, or partially within autonomous sailing vehicle 100, including but not limited to primary hull 102, outrigger hulls 116-118, boom 114, tail 112, rigid wing 108, or any other component of autonomous sailing vehicle 100. In one or more preferred embodiments, transmission devices associated with communication devices 130-132 are above the water line when autonomous sailing vehicle 100 is in normal operating range. However, one or more transmission devices associated with communication devices 130-132 may be positioned below the water line in normal operating range without departing from the spirit or the scope of the invention.

Figure 3:
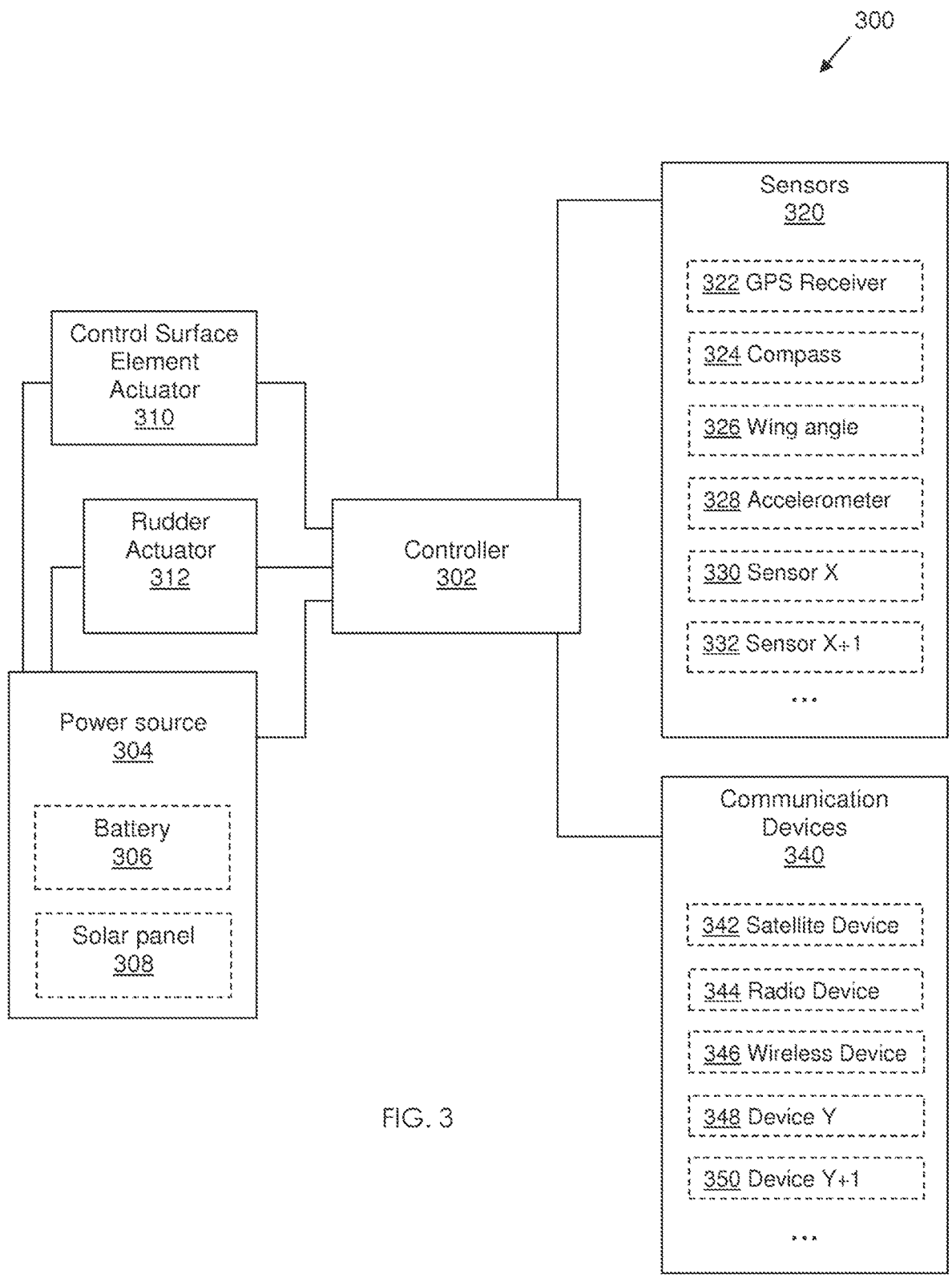
FIG. 3 illustrates a system diagram in accordance with one or more embodiments of autonomous unmanned sailing vehicles described herein.

FIG. 3 illustrates a system diagram in accordance with one or more embodiments of autonomous unmanned sailing vehicles described herein. System 300 includes controller 302. Controller 302 is configured to obtain and/or maintain a desired heading of an unmanned sailing vehicle. In one embodiment, controller 302 may be configured to obtain one or more waypoints and navigate an unmanned sailing vehicle to the one or more waypoints without additional communication to direct navigation. As used herein, the term "waypoint" refers to any data containing a geographic location. Additionally, controller 302 may be configured to obtain one or more paths and navigate the one or more paths without additional communication to direct navigation.

In one embodiment, controller 302 may further be configured to handle one or more obstacles, including weather, unauthorized areas, other vehicles, or any other obstacle or danger. The obstacles may be identified by one or more sensors 320. Alternatively, information about the obstacles may be received via one or more communication device 340.

System 300 further includes at least one power source 304. Power source 304 may include one or more power sources, such as battery 306 and solar panel 308. Power source 304 is configured to power controller 302. Power source 304 may further be configured to power one or more mechanical components, such as control surface element actuator 310 and rudder actuator 312. In a preferred embodiment, power source 304 includes at least one solar panel 308 configured to charge at least one rechargeable battery 306, where the battery 306 is configured to power controller 302, control surface element actuator 310 and rudder actuator 312. In one or more embodiments, battery 306 is further configured to power at least one of sensors 320 and/or communication devices 340. Alternatively, at least one of sensors 320 and/or communication devices 340 may be powered by another power source.

System 300 further includes control surface element actuator 310. Control surface element actuator 310 is configured to position the control surface element based on a signal received from controller 302. Control surface element actuator 310 may include any combination of electronic and/or mechanical elements capable of repositioning the control surface element, including but not limited to motors, gears, belts, rods, and any other component.

System 300 further includes rudder actuator 312. Rudder actuator 312 is configured to position the rudder based on a signal received from controller 302. In one embodiment, rudder actuator 312 is specifically configured to position a rudder tab component of the rudder. Rudder actuator 312 may include any combination of electronic and/or mechanical elements capable of repositioning the control surface element, including but not limited to motors, gears, belts, rods, and any other component.

System 300 further includes one or more sensors 322-332 (collectively, sensors 320). Sensors 320 may include one or more sensors capable of collecting data. As used herein, the term "sensor" refers to any device capable of collecting and/or receiving data. In one embodiment, sensors 320 include one or more devices capable of receiving one-way communications, such as GPS receiver 322. Sensors 320 may further include compass 324, wing angle sensor 326, accelerometer 328, other instruments relating to navigation, other instruments relating to vehicle operation and/or vehicle state, environmental sensors such as temperature, moisture, chemical or any other environmental sensor, or any other device capable of collecting and/or receiving data.

In one embodiment, sensors 320 include one or more devices included as payload, which may be positioned fully within, partially within or external to one or more payload bays.

Sensors 320 may be communicatively coupled with controller 302, such as via a wire, circuit or another electronic component. Sensors 320 may also communicate wirelessly with controller 302. In one embodiment, one or more of sensors 320 are not communicatively coupled with controller 302. For example, sensors not communicatively coupled with controller 302 may be communicatively coupled with one or more of an independent controller, a communication device (e.g. communication devices 340), a logging device, or any other device capable of utilizing data collected by the sensor.

System 300 further includes one or more communication devices 342-350 (collectively, communication devices 340). As used herein, the term "communication device" refers to any device capable of transmitting data, including one-way devices capable of transmission only as well as devices capable of both transmitting and receiving data. In one embodiment, communication devices 340 include one or more devices capable of two-way communication, such as satellite device 342, radio device 344, wireless device 346, or any other communication device.

Communication devices 340 may be communicatively coupled with controller 302, such as via a wire, circuit or another electronic component. Communication devices 340 may also communicate wirelessly with controller 302, such as via wireless device 346 or another wireless device coupled with controller 302. In one embodiment, one or more of communication devices 340 are not communicatively coupled with controller 302. For example, communication devices not communicatively coupled with controller 302 may be communicatively coupled with one or more of an independent controller, a sensor (e.g. sensors 320), a logging device, or any other device capable of utilizing a communication device.

In one embodiment, at least one of communication devices 340 is configured to transmit data generated by controller 302 based on at least one of sensors 320.

In one embodiment, controller 302 is configured to obtain at least one waypoint location from any of communication devices 340, preferably but not limited to satellite device 342.

In one embodiment, a payload unit includes at least one of an independent controller, an independent power source, an independent payload sensor, an independent payload communication device, and/or an independent logging device.

In one embodiment, controller 302 is configured to determine and maintain a desired heading. The desired heading is determined by obtaining sensor information. Controller 302 may use any information received from sensors 320 to determine the desired heading, including but not limited to information from environmental sensors, navigation instruments, and sensors relating to vehicle operation and/or vehicle state. In one embodiment, controller 302 is configured to estimate the wind direction based on a compass reading from compass 324 and a rigid wing angle from wing angle sensor 326. Based on the sensor information, controller 302 determines a control surface angle and a rudder position required to maintain the desired heading. Controller 302 transmits signals to control surface element actuator 310 and rudder actuator 312 based on the determined control surface angle and rudder position.

Controller 302 may periodically obtain updated sensor information and update the control surface element angle and/or rudder position. In one embodiment, the rudder position is updated between about 100 times a second and about one time a minute. More specifically, the rudder position may be updated between about 60 times a second and about 10 times second. In one embodiment, the control surface element angle can be selected from a first maximum angle, a second maximum angle, and a neutral angle, and is updated when there is a change in desired heading across the direction of the wind or when little to no lift is desired. In another embodiment, the control surface element angle is continuous between the first maximum angle and the second maximum angle, and the control surface element angle is updated periodically.

Controller 302 may be configured to calculate a plurality of control surface angles in real time navigation, generate a plurality of signals, and transmit the plurality of signals to control surface element actuator 310 to cause control surface element actuator 310 to position the control surface element based on the plurality of control surface angles.

Figure 4:
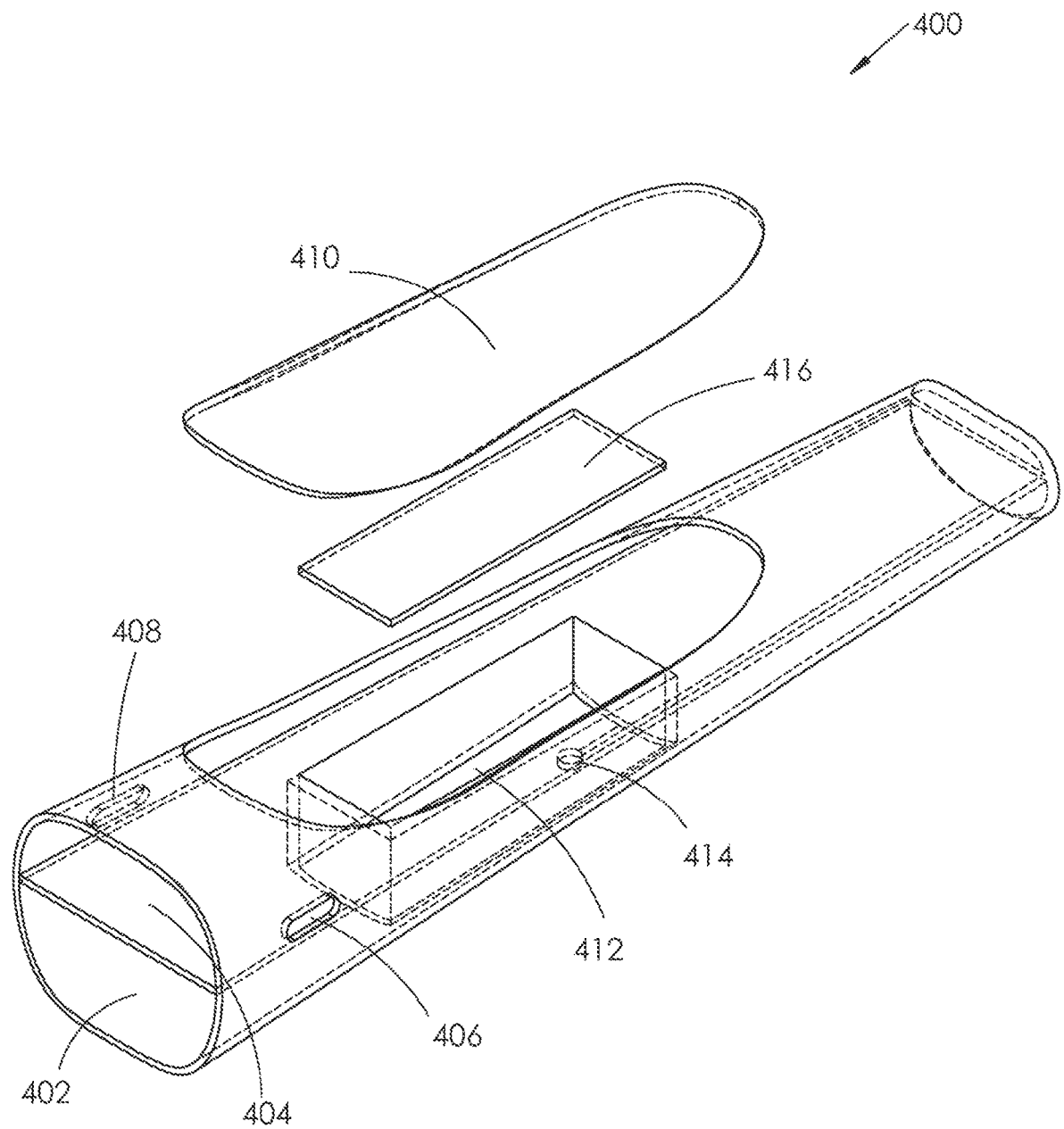
FIG. 4 illustrates a see-through cutaway view of an embodiment of a primary hull in accordance with one or more embodiments of autonomous unmanned sailing vehicles described herein.

FIG. 4 illustrates a see-through cutaway view of an embodiment of a primary hull in accordance with one or more embodiments of autonomous unmanned sailing vehicles described herein. Hull 400 is a hull of an autonomous sailing vehicle. In one embodiment, hull 400 is a primary hull of an autonomous sailing vehicle.

In one embodiment, hull 400 includes at least one fully sealed compartment 402. Fully sealed compartment 402 may be a sealed chamber substantially free of any solid or liquid inside the chamber. Alternatively, fully sealed compartment 402 may be a solid buoyant material that is substantially impenetrable by water, such as a closed-cell foam or any other suitable buoyant material.

In one embodiment, the at least one fully sealed compartment 402 includes a selectively floodable compartment. One or more selectively floodable compartments may also be located in the rigid wing of the autonomous sailing vehicle, in addition to or in replacement of the selectively floodable compartment in hull 400. When the one or more selectively floodable compartments are flooded, the autonomous sailing is partially or substantially lowered below the water line. The controller may be configured to generate the signal to lower the autonomous sailing vehicle under one or more conditions, such as when a stealth mode is desired, when weather conditions at the sea surface pose a threat to the autonomous sailing vehicle, or under any other condition where lowered buoyancy is suitable. When a controller generates a signal to lower the autonomous sailing vehicle, the one or more selectively floodable compartments unseal to fill with water, reducing the buoyancy of the autonomous sailing vehicle to the desired level.

In one embodiment, hull 400 further includes at least one partially sealed compartment 404. In one embodiment, partially sealed compartment 404 is positioned above fully sealed compartment 402. Partially sealed compartment 404 is positioned above the water line when the autonomous sailing vehicle is positioned within normal operating range.

In one embodiment, hull 400 further includes at least one drain 406-408. Drains 406-408 are positioned to allow substantially complete drainage of partially sealed compartment 404 when the autonomous sailing vehicle is positioned within normal operating range. For example, one or more drains 406-408 may be disposed at a low point of hull 400. The positioning of the one or more drains 406-408 may take into account any rotation of hull 400, such as rolling and/or pitching of hull 400.

In one embodiment, hull 400 further includes at least one hatch 410. Hatch 410 is a fully or partially removable hull component configured to allow access to an interior of hull 400. The interface between hatch 410 and hull 400 may include a watertight seal. Alternatively, the interface between hatch 410 and hull 400 is not watertight, and water that enters hull 400 from the interface exits through drains 406-408 when the autonomous sailing vehicle is positioned within normal operating range.

In one embodiment, hull 400 further includes at least one payload bay 412. Payload bay 412 may be a fully sealed or partially sealed compartment of hull 400. Payload bay 412 is configured to hold one or more of equipment, sensors, monitoring devices, communication devices, weapons, or any other device suitable for placing in a payload bay disposed in lower hull 400. In one embodiment, payload bay 412 includes at least one outlet configured to allow at least a portion of a piece of equipment, sensor, monitoring device, communication device, weapon, or any other device to access an exterior of hull 400, e.g. to access air and/or water, including ocean water. Outlet 414 may include or omit a watertight seal.

In one embodiment, outlet 414 is configured to allow a water level within payload bay 412 to naturally rise to an equilibrium level, filling at least a portion of payload bay 412 when the autonomous sailing vehicle is positioned within normal operating range. Water that escapes payload bay 412 may exit hull 400 through one or more drains 406-408.

In one embodiment, payload bay 412 includes at least one payload bay cover. The interface between hatch 410 and hull 400 may include or omit a watertight seal.

In one embodiment, a controller is located within hull 400, such as within a fully sealed compartment 402 or within a waterproof enclosure positioned within a partially sealed compartment 404 of hull 400.

Figure 5:
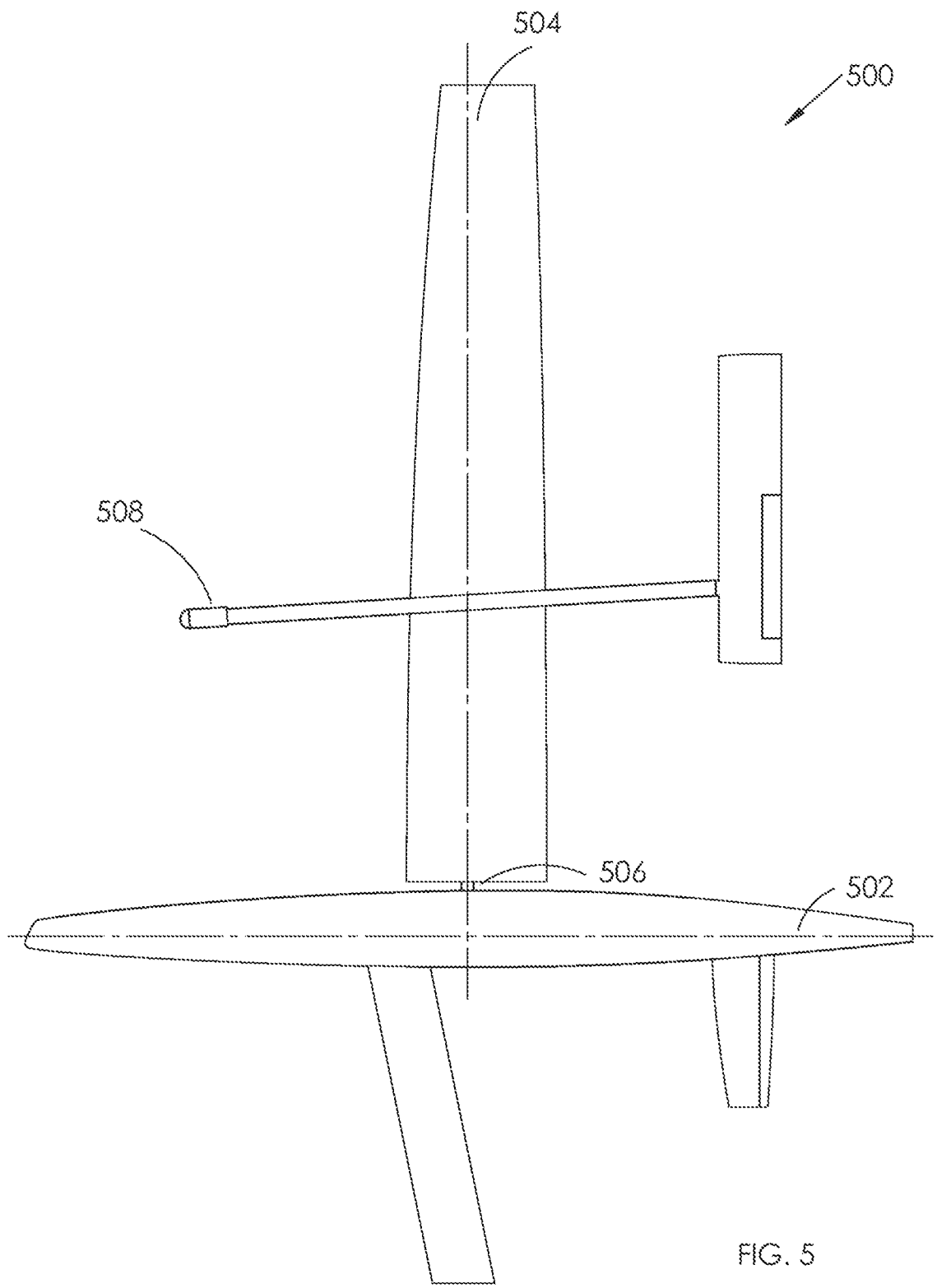
FIG. 5 illustrates a side view of an embodiment of an autonomous unmanned sailing vehicle in accordance with one or more embodiments of autonomous unmanned sailing vehicles described herein.

FIG. 5 illustrates a side view of an embodiment of an autonomous unmanned sailing vehicle in accordance with one or more embodiments of autonomous unmanned sailing vehicles described herein. A primary axis 502 of autonomous sailing vehicle 500 and a rotational axis 504 of a rigid wing of autonomous sailing vehicle 500 is shown. The rigid wing is rotationally coupled with a hull of autonomous sailing vehicle 500 at rotational joint 506 such that the rigid wing freely rotates about rotational axis 504. The rigid wing and any component coupled with and configured to rotate with the rigid wing may be statically and/or dynamically balanced with respect to rotational axis 504.

Figure 6A:
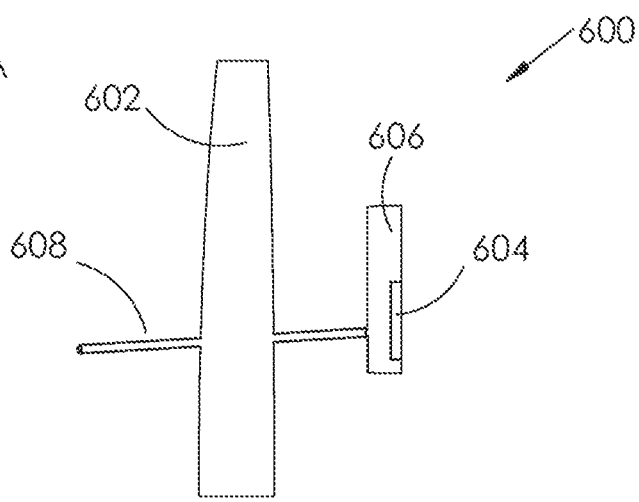
FIGS. 6A-6C illustrate embodiments of control surface elements in accordance with one or more embodiments of autonomous unmanned sailing vehicles described herein.
Figure 6B:
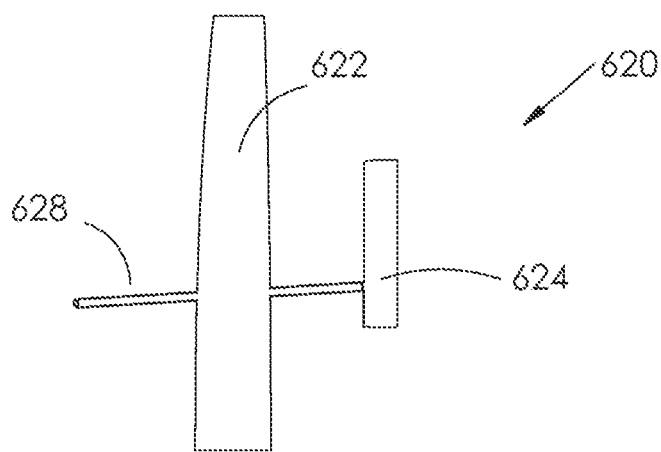
Figure 6C:
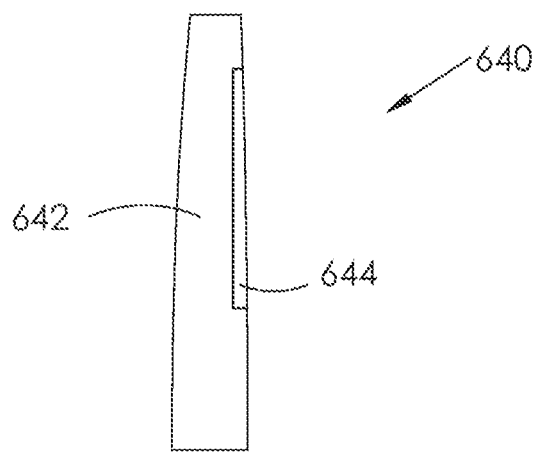

FIGS. 6A-6C illustrate embodiments of control surface elements in accordance with one or more embodiments of autonomous unmanned sailing vehicles described herein. FIG. 6A illustrates an embodiment of a wing assembly in accordance with one or more embodiments of autonomous unmanned sailing vehicles described herein. Wing assembly 600 includes rigid wing 602. Control surface element 604 is disposed on tail 606.

A controller may be configured to determine a control surface angle associated with a desired direction of travel determined by the controller and generate a signal to position control surface element 604 based on the control surface angle. Tail 606 may be coupled with rigid wing 602 by boom 608. Rigid wing assembly 600 may be dynamically balanced with respect to the rotational axis of rigid wing 602. In one embodiment, the first end of boom 608 extends from a leading edge of rigid wing 602 and is coupled with a counterweight configured to dynamically balance rigid wing assembly 600 with respect to the rotational axis of rigid wing 602. The second end of boom 608 extends from a trailing edge of rigid wing 602 and is coupled with tail 606.

FIG. 6B illustrates an embodiment of a wing assembly in accordance with one or more embodiments of autonomous unmanned sailing vehicles described herein. Wing assembly 620 includes rigid wing 622. In one embodiment, control surface element 624 is directly coupled with rigid wing 622 by boom 628. Control surface element 624 is configured to aerodynamically control a wing angle of rigid wing 622 based on a force exerted by wind on control surface element 624. A controller may be configured to determine a control surface angle associated with a desired direction of travel determined by the controller and generate a signal to position control surface element 624 based on the control surface angle. Rigid wing assembly 620 may be dynamically balanced with respect to the rotational axis of rigid wing 622. In one embodiment, the first end of boom 628 extends from a leading edge of rigid wing 622 and is coupled with a counterweight configured to dynamically balance rigid wing assembly 620 with respect to the rotational axis of rigid wing 622.

FIG. 6C illustrates an embodiment of a wing assembly in accordance with one or more embodiments of autonomous unmanned sailing vehicles described herein. Wing assembly 640 includes rigid wing 642. In one embodiment, control surface element 644 is disposed on rigid wing 642. Control surface element 644 may be disposed toward a trailing edge of rigid wing 642. A controller may be configured to determine a control surface angle associated with a desired direction of travel determined by the controller and generate a signal to position control surface element 644 based on the control surface angle. Rigid wing assembly 640 may be dynamically balanced with respect to the rotational axis of rigid wing 642.

FIGS. 7A-7D illustrate front views of exemplary autonomous unmanned sailing vehicles in accordance with one or more embodiments of autonomous unmanned sailing vehicles described herein. Although a tilt in the direction of second outrigger hull 706 is not shown, in FIGS. 7B-7C, a symmetric effect will occur. In combination with one or more other features described herein, the self-righting configuration shown in FIGS. 7A-7D contribute to the ability of the autonomous sailing vehicle to withstand rougher sea states, including the effects of wind, other weather, waves, and/or swell, including the ability to return to a position within the normal operating range.

Figure 7A:
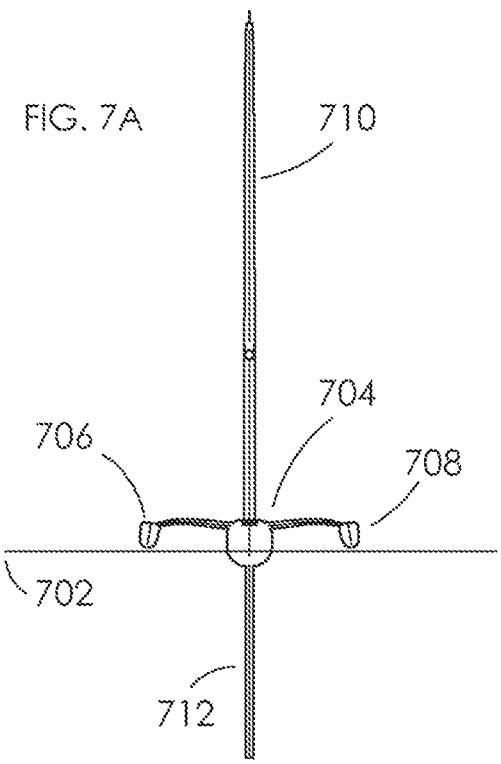
FIGS. 7A-7D illustrate front views of embodiments of autonomous unmanned sailing vehicles in accordance with one or more embodiments of autonomous unmanned sailing vehicles described herein.

In FIG. 7A, autonomous sailing vehicle 700 is shown in fully upright position A. In one embodiment, first outrigger hull 706 and second outrigger hull 708 are positioned above the water line 702 when autonomous sailing vehicle 720 is in a fully upright position. The positive righting moments of primary hull 704 and keel 712 contribute to the stability of autonomous sailing vehicle 700 in fully upright position A.

Figure 7B:
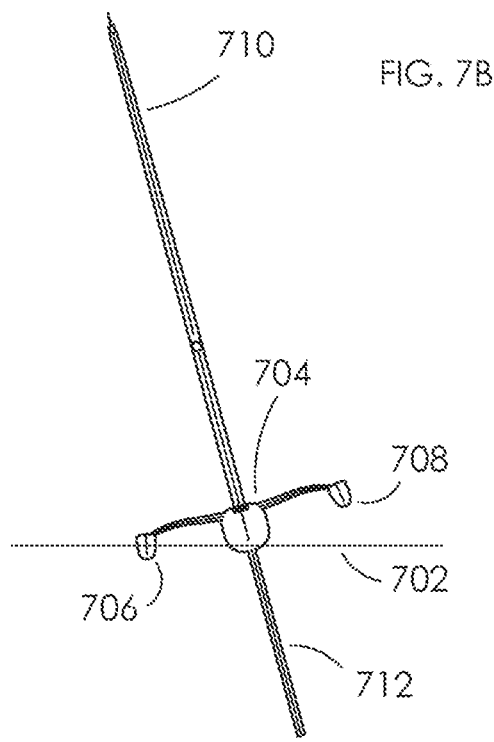

In FIG. 7B, autonomous sailing vehicle 700 is shown in position B. Position B is within the normal operating range of autonomous sailing vehicle 700. Autonomous sailing vehicle 700 is rotated about a primary axis of primary hull 704 in the direction of first outrigger hull 706. First outrigger hull 706 is partially submerged and generating a positive righting moment, while second outrigger hull 708 remains above the water line 702. The positive righting moments of primary hull 704, first outrigger hull 706 and keel 712 contribute to the stability of autonomous sailing vehicle 700 in position B.

Figure 7C:
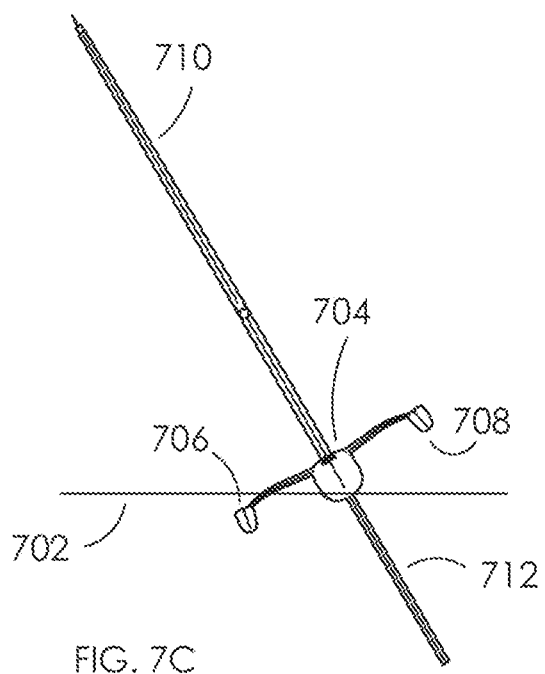

In FIG. 7C, autonomous sailing vehicle 700 is shown in position C. Position C is within the normal operating range of autonomous sailing vehicle 700. Compared to position B, autonomous sailing vehicle 700 is further rotated about the primary axis of primary hull 704 in the direction of first outrigger hull 706. First outrigger hull 706 is fully submerge and generating a positive righting moment, while second outrigger hull 708 remains above the water line 702. Because the entire volume of first outrigger hull 706 is submerged, the upwards force caused by the buoyancy of first outrigger hull 706 is maximized. The positive righting moments of primary hull 704, first outrigger hull 706 and keel 712 contribute to the stability of autonomous sailing vehicle 700 in position C.

Figure 7D:
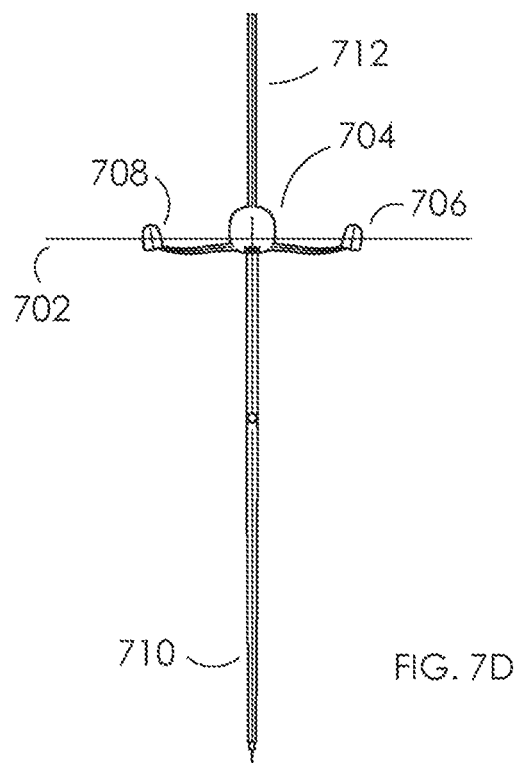

In FIG. 7D, autonomous sailing vehicle 700 is shown in capsized position D, which is outside of the normal operating range of autonomous sailing vehicle 700. Primary hull 704, first outrigger hull 706 and second outrigger hull 708 generate negative righting moments (i.e. capsizing moments) that tend to cause autonomous sailing vehicle 700 to remain in capsized position D. However, position D is inherently unstable because keel 712 includes ballast sufficient to provide a positive righting moment sufficient to passively right autonomous sailing vehicle 700 from any position, including position D and any other position outside of normal operating range. Keel 712 contains sufficient ballast to account for the negative righting moment of primary hull 704 as well as the negative righting moments of first outrigger hull 706 and second outrigger hull 708 in position D. Therefore, positions outside of the normal operating range of autonomous sailing vehicle 700 are inherently unstable, while positions within the normal operating range are inherently stable.

Figure 8A:
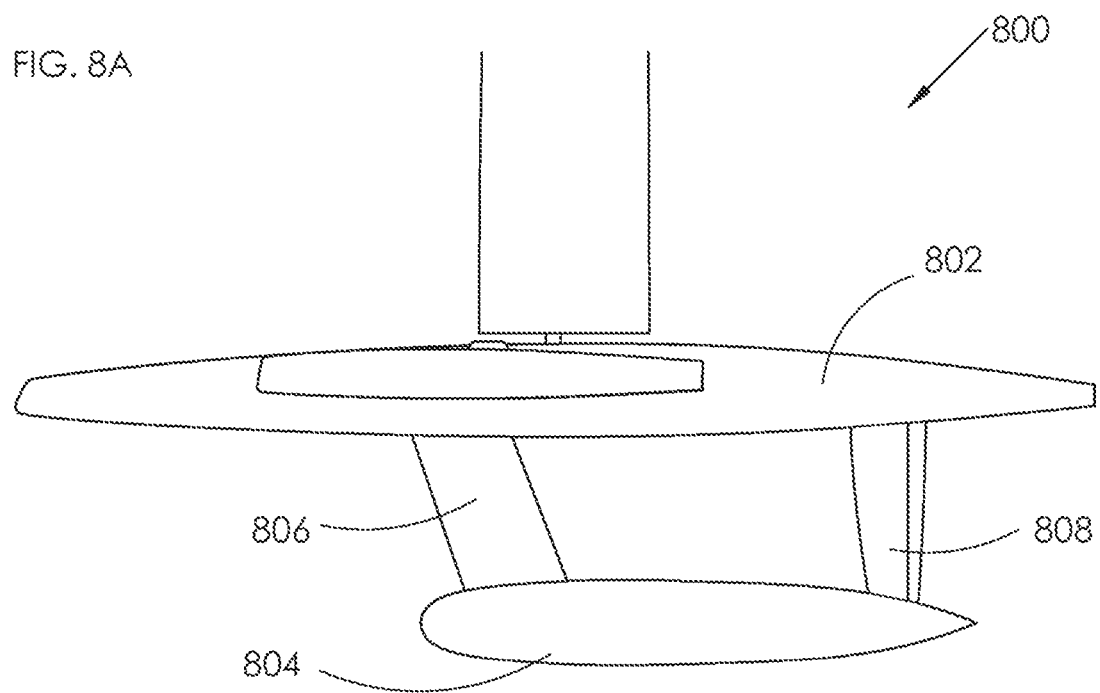
FIGS. 8A-8B illustrate embodiments of autonomous unmanned sailing vehicles in accordance with one or more embodiments of autonomous unmanned sailing vehicles described herein.
Figure 8B:
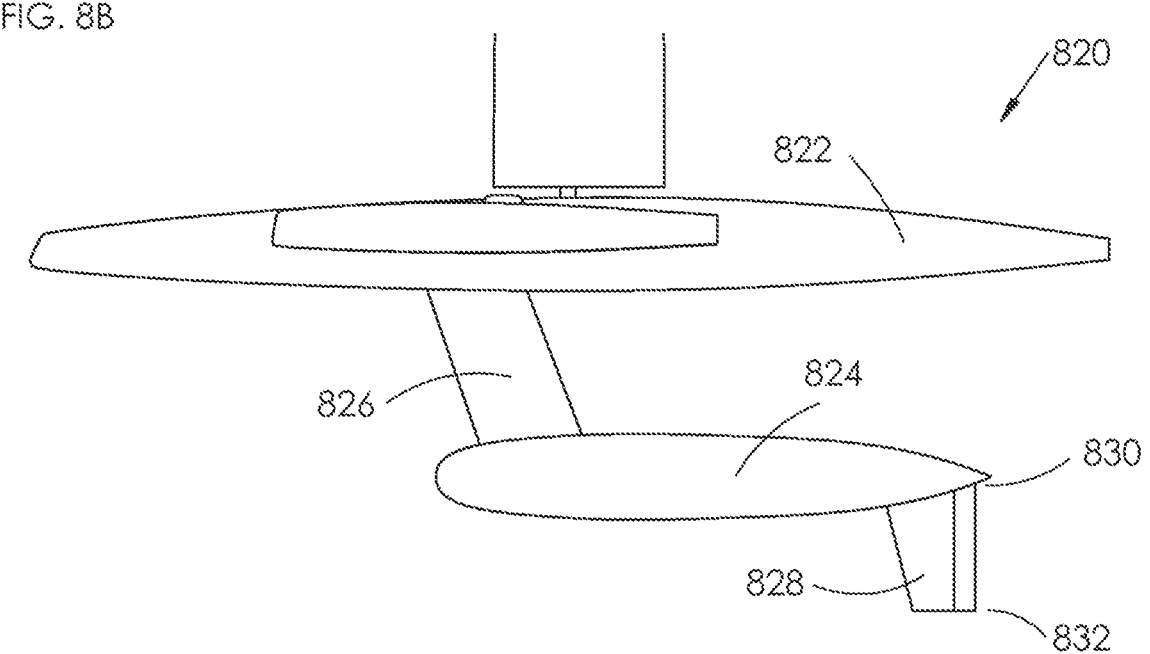

FIGS. 8A-8B illustrate embodiments of autonomous unmanned sailing vehicles in accordance with one or more embodiments of autonomous unmanned sailing vehicles described herein.

FIG. 8A illustrates a partial view of an embodiment of an autonomous sailing vehicle in accordance with one or more embodiments of autonomous unmanned sailing vehicles described herein. Autonomous sailing vehicle 800 includes lower bulb 804. Keel 806 is coupled with primary hull 802 at a first end and lower bulb 804 at a second end. Rudder 808 is coupled with primary hull 802 at a first end and lower bulb 804 at a second end. Lower bulb 804 may be negatively buoyant and may provide and/or contribute to a positive righting moment sufficient to restore autonomous sailing vehicle 800 to an upright position, including a position within a normal operating range.

Lower bulb 804 may include one or more payload bays configured to hold one or more of equipment, sensors, monitoring devices, communication devices, weapons, or any other device suitable for placing in a payload bay disposed in lower bulb 804. In one embodiment, lower bulb 804 includes a housing configured to hold one or more of equipment, sensors, monitoring devices, communication devices, weapons, or any other device. Alternatively, the second end of keel 806 and the second end of rudder 808 may be coupled directly with one or more of equipment, sensors, monitoring devices, communication devices, weapons, or any other suitable device.

FIG. 8B illustrates a partial view of an embodiment of an autonomous vehicle in accordance with one or more embodiments of autonomous unmanned sailing vehicles described herein. Autonomous sailing vehicle 820 includes lower bulb 824. Keel 826 is coupled with primary hull 822 at a first end and lower bulb 824 at a second end. Rudder 828 is coupled with lower bulb 824 at a first end 830 and extends from lower bulb 804 at a second end 832. Lower bulb 824 may be negatively buoyant and may provide and/or contribute to a positive righting moment sufficient to restore autonomous sailing vehicle 822 to an upright operating position.

Lower bulb 824 may include one or more payload bays configured to hold one or more of equipment, sensors, monitoring devices, communication devices, weapons, or any other device suitable for placing in a payload bay disposed in lower bulb 824. In one embodiment, lower bulb 824 includes a housing configured to hold one or more of equipment, sensors, monitoring devices, communication devices, weapons, or any other device. Alternatively, the second end of keel 826 and the first end of rudder 828 may be coupled directly with one or more of equipment, sensors, monitoring devices, communication devices, weapons, or any other suitable device.

Figure 9:
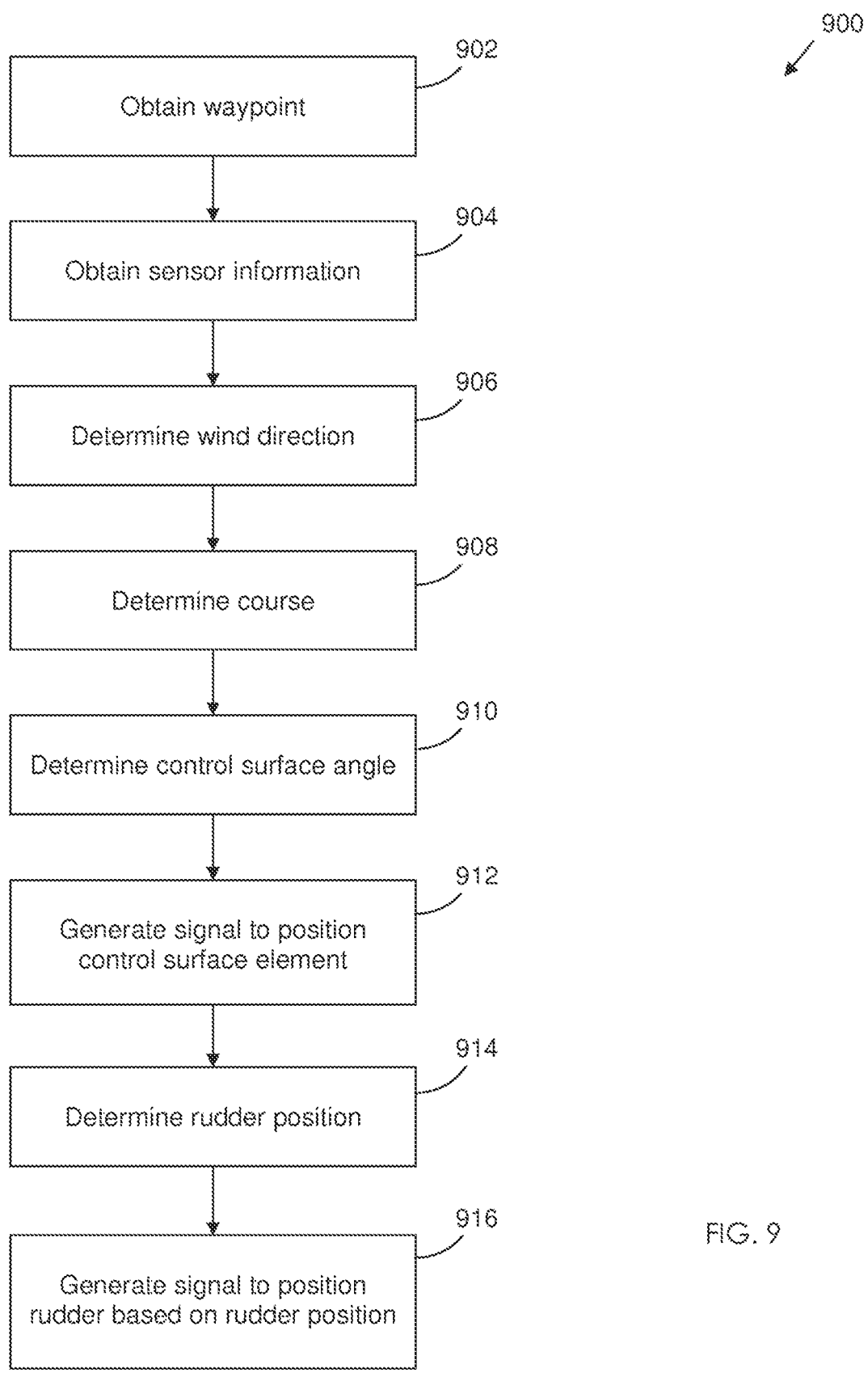
FIG. 9 illustrates a flowchart of a method for controlling an autonomous unmanned sailing vehicle in accordance with one or more embodiments of autonomous unmanned sailing vehicles described herein.

FIG. 9 illustrates a flowchart of a method for controlling an autonomous unmanned sailing vehicle in accordance with one or more embodiments of autonomous unmanned sailing vehicles described herein. For example, process 900 may be performed in one or more computing devices, such as but not limited to controller 302.

At block 902, a waypoint is obtained. The waypoint may be obtained by wireless communication, such as via a satellite communication, a cellular communication, a WLAN communication, or any other wireless communication. The waypoint may also be obtained from one or more local storage devices. In one embodiment, a waypoint may be obtained by obtaining data from which a waypoint may be calculated, such as a distance or coordinate relative to another geographic location, such as another waypoint, a current position, or any other geographic location. A sequence of waypoints to be visited may be obtained and/or stored. In one embodiment, one or more waypoints may be calculated, such as to provide a desired coverage of a predetermined area. For example, the one or more waypoints may include locations where sampling, monitoring, testing, or any other operation is to be carried out. In one embodiment, continuous or periodic sampling, monitoring, testing, or any other operation is carried out over a path of navigation between two or more waypoints.

At block 904, sensor information is obtained, including but not limited to information from environmental sensors, navigation instruments, and sensors relating to vehicle operation and/or vehicle state.

At block 906, wind direction is determined based on sensor information from one or more sensors. In one embodiment, the wind direction is estimated based on a compass reading and a rigid wing angle.

At block 908, a course is determined for navigating to the waypoint. The course may include a series of control surface element changes along a path analogous to tacking and jibing in traditional sailing.

At block 910, a control surface angle is determined. In one embodiment, the control surface element angle can be selected from a first maximum angle, a second maximum angle, and a neutral angle, and is updated when there is a change in desired heading across the direction of the wind or when little to no lift is desired. In another embodiment, the control surface element angle is continuous between the first maximum angle and the second maximum angle.

At block 912, a signal is generated to position the control surface element based on the determined control surface angle.

At block 914, a rudder position is determined. The rudder position may correspond to the position of a rudder tab component of the rudder.

At block 916, a signal is generated to position the rudder based on the determined rudder position.

Figure 10A:
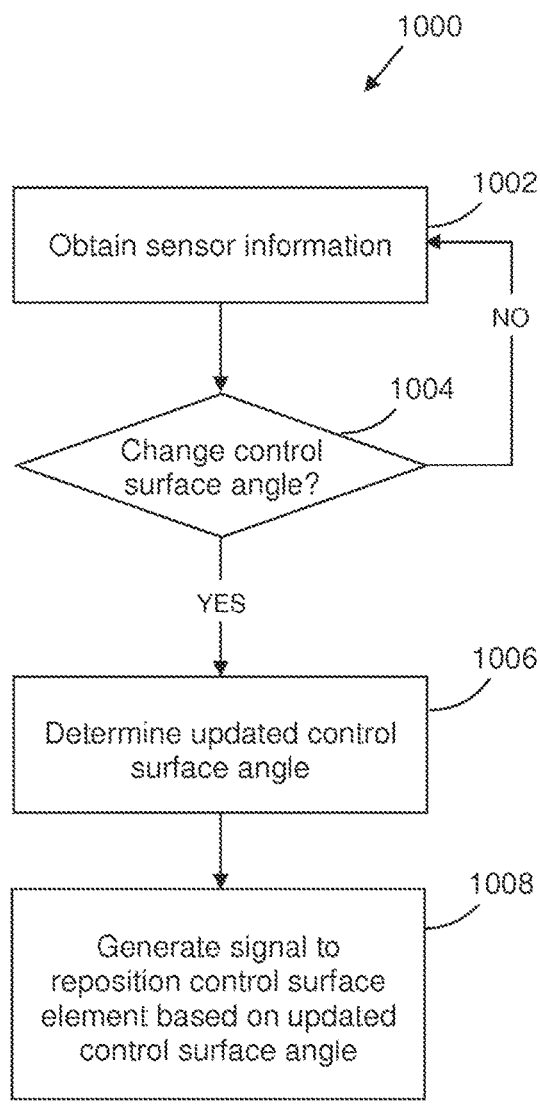
FIGS. 10A-B illustrate flowcharts of methods for controlling an autonomous unmanned sailing vehicle in accordance with one or more embodiments of autonomous unmanned sailing vehicles described herein.
Figure 10B:
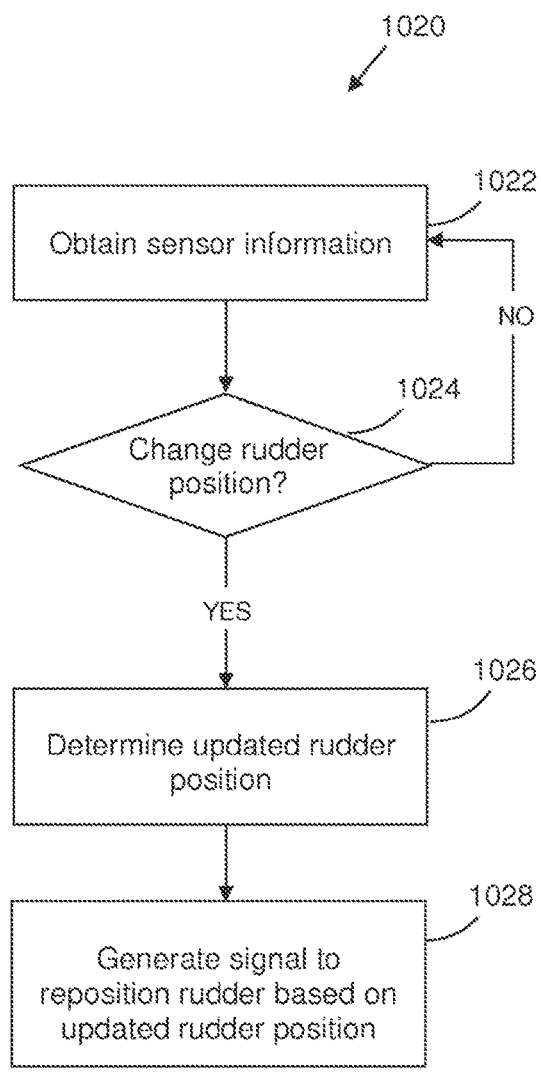

FIGS. 10A-B illustrate flowcharts of methods for controlling an autonomous unmanned sailing vehicle in accordance with one or more embodiments of autonomous unmanned sailing vehicles described herein.

FIG. 10A illustrates a flowchart of a method for controlling an autonomous unmanned sailing vehicle in accordance with one or more embodiments of autonomous unmanned sailing vehicles described herein. For example, process 1000 may be performed in one or more computing devices, such as but not limited to controller 302.

At block 1002, sensor information is obtained. Previously processed sensor information may be used, as well as updated sensor information.

At decision block 1004, it is determined whether to change the control surface angle. The control surface angle may be updated periodically. In one embodiment, the control surface angle is updated when there is a change in desired heading across the direction of the wind or when little to no lift is desired. If it is determined that the control surface angle is not to be changed, processing returns to block 1002. Otherwise, processing continues to block 1006.

At block 1006, an updated control surface angle is determined.

At block 1008, a signal is generated to reposition the control surface element based on the updated control surface angle.

FIG. 10B illustrates a flowchart of a method for controlling an autonomous unmanned sailing vehicle in accordance with one or more embodiments of autonomous unmanned sailing vehicles described herein. For example, process 1020 may be performed in one or more computing devices, such as but not limited to controller 302.

At block 1022, sensor information is obtained.

At decision block 1024, it is determined whether to change the rudder position. The rudder position may be updated periodically. In one embodiment, the rudder position is updated between about 100 times a second and about one time a minute. More specifically, the rudder position may be updated between about 60 times a second and about 10 times second. If it is determined that the rudder position is not to be changed, processing returns to block 1022. Otherwise, processing continues to block 1026.

At block 1026, an updated rudder position is determined. The rudder position may correspond to the position of a rudder tab component of the rudder.

At block 1028, a signal is generated to reposition the rudder based on the updated rudder position. In one embodiment, the signal is generated to reposition a rudder tab component of the rudder.

While the invention herein disclosed has been described by means of specific embodiments and applications thereof, numerous modifications and variations could be made thereto by those skilled in the art without departing from the scope of the invention set forth in the claims.

What is claimed is:

1. An unmanned sailing vehicle comprising;
   a primary hull;
   a rigid wing rotationally coupled with said primary hull, wherein said rigid wing freely rotates about a rotational axis of said rigid wing;
   a boom comprising a first end extending from a leading edge of said rigid wing and a second end extending from a trailing edge of said rigid wing, said first end of said boom comprising a counterweight configured to dynamically balance a wing system comprising said rigid wing, said boom, and a tail coupled to said second end of said boom with respect to said rotational axis of said rigid wing;
   a control surface element disposed on said tail and configured to aerodynamically control a wing angle of said rigid wing based on a position of said control surface element;
   a controller configured to determine a control surface angle and generate a signal to position said control surface element based on said control surface angle.

2. The unmanned sailing vehicle of claim 1, wherein the controller is configured to calculate a plurality of control surface angles in real time during navigation to maintain a desired heading and generate a plurality of signals to position said control surface element based on said plurality of control surface angles.

3. The unmanned sailing vehicle of claim 1, further comprising a rudder, wherein said controller is further configured to determine a rudder position and generate a signal to position said rudder to said rudder position.

4. The unmanned sailing vehicle of claim 1, further comprising a keel coupled with said primary hull at a first end of said keel, wherein said keel comprises ballast sufficient to provide a positive righting moment sufficient to cause said primary hull to passively right from any position.

5. The unmanned sailing vehicle of claim 1, further comprising a wireless communication device comprising an antenna,
   wherein said controller is further configured to obtain at least one waypoint location from said wireless communication device.

6. The unmanned sailing vehicle of claim 5, wherein said wireless communication device is further configured to transmit data generated by said controller based on at least one device coupled with said controller.

7. The unmanned sailing vehicle of claim 3, wherein said controller is further configured to periodically determine an updated rudder position and generate a signal to position said rudder to said updated rudder position.

8. The unmanned sailing vehicle of claim 1, wherein said primary hull comprises a narrow bow with reduced buoyancy.

9. The unmanned sailing vehicle of claim 1, wherein said primary hull comprises at least one fully sealed compartment and at least one partially sealed compartment positioned above said at least one fully sealed compartment and above water line when said primary hull is in an orientation where the rigid wing is capable of generating lift,
   wherein said at least one partially sealed compartment comprises at least one drain positioned to allow substantially complete drainage of said at least one partially sealed compartment when said primary hull is positioned in said orientation.

10. The unmanned sailing vehicle of claim 1, further comprising at least one payload bay.

11. The unmanned sailing vehicle of claim 10, wherein said at least one payload bay is disposed on said primary hull.

12. The unmanned sailing vehicle of claim 4, further comprising a lower bulb coupled with a second end of said keel;
   wherein said lower bulb is negatively buoyant.

13. The unmanned sailing vehicle of claim 3, further comprising a lower bulb coupled with a first end of said rudder,
wherein a second end of said rudder extends from said lower bulb, and
wherein said lower bulb is negatively buoyant.

14. The unmanned sailing vehicle of claim 1, further comprising at least one buoyant wing compartment, wherein at least one of said primary hull and said rigid wing comprises at least one sealed compartment configured to selectively flood to submerge said primary hull and said rigid wing, leaving said at least one buoyant wing compartment above water line.

15. The unmanned sailing vehicle of claim 1, further comprising at least one power source coupled with said controller,
wherein said at least one power source comprises at least one solar panel coupled with at least one battery.

16. The unmanned sailing vehicle of claim 1, wherein said controller is further configured to estimate a wind direction based on a compass reading, said wing angle, said control surface angle and an estimated sailing model generated by said controller.

17. The unmanned sailing vehicle of claim 1, wherein said control surface element is disposed on said rigid wing toward a trailing edge of said rigid wing.

18. The unmanned sailing vehicle of claim 4, further comprising:
a first outrigger hull configured to provide a first additional righting moment when said primary hull is rotated in a first direction about its primary axis; and
a second outrigger hull configured to provide a second additional righting moment when said primary hull is rotated in a second direction about its primary axis,
wherein said ballast is sufficient to passively right said primary hull from any position given said first additional righting moment and said second additional righting moment.

19. The unmanned sailing vehicle of claim 1, wherein said rotational axis is selected to statically balance the wing system with respect to said rotational axis of said rigid wing.

20. The unmanned sailing vehicle of claim 1, wherein the rigid wing comprises at least one positively buoyant sealed compartment, wherein the positively buoyant sealed compartment provides a positive righting moment when the rigid wing is submerged.

* * * * *